(12) United States Patent
Bisson et al.

(10) Patent No.: US 9,351,056 B2
(45) Date of Patent: May 24, 2016

(54) PLANNING OF OPTICAL CONNECTIONS IN A WDM OPTICAL NETWORK

(71) Applicant: Alcatel Lucent, Boulogne Billancourt (FR)

(72) Inventors: Arnaud Bisson, Nozay (FR); Annalisa Morea, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 79 days.

(21) Appl. No.: 14/482,199

(22) Filed: Sep. 10, 2014

(65) Prior Publication Data
US 2015/0098699 A1    Apr. 9, 2015

(30) Foreign Application Priority Data

Oct. 8, 2013    (EP) .................................... 13306388

(51) Int. Cl.
*H04B 10/00* (2013.01)
*H04Q 11/00* (2006.01)
*H04J 14/02* (2006.01)
*H04L 12/24* (2006.01)

(52) U.S. Cl.
CPC ........ *H04Q 11/0062* (2013.01); *H04J 14/0227* (2013.01); *H04J 14/0254* (2013.01); *H04J 14/0267* (2013.01); *H04J 14/0271* (2013.01); *H04L 41/145* (2013.01); *H04Q 2011/0079* (2013.01)

(58) Field of Classification Search
USPC ...................................................... 398/45–57
See application file for complete search history.

(56) References Cited

U.S. PATENT DOCUMENTS

| | | | | |
|---|---|---|---|---|
| 6,073,248 A * | 6/2000 | Doshi | ................. | H04J 14/0227 398/1 |
| 6,850,705 B2 * | 2/2005 | Su | ......................... | H04B 10/032 398/5 |
| 7,716,271 B1 * | 5/2010 | Bertsekas | ............... | G06F 15/16 370/235 |
| 7,751,345 B2 * | 7/2010 | Hashiguchi | ......... | H04J 14/0227 370/255 |
| 8,380,072 B2 * | 2/2013 | Wang | ................. | H04Q 11/0062 398/115 |
| 8,433,192 B2 * | 4/2013 | Frankel | .............. | H04B 10/0795 398/16 |
| 8,588,135 B2 * | 11/2013 | Wang | ................. | H04Q 11/0062 370/328 |
| 8,644,710 B2 * | 2/2014 | Wellbrock | ............ | H04J 14/021 398/50 |
| 2003/0009598 A1 | 1/2003 | Gunluk et al. | | |
| 2004/0247317 A1 * | 12/2004 | Sadananda | .............. | H04L 45/02 398/57 |
| 2006/0002310 A1 | 1/2006 | Zolfaghari et al. | | |
| 2009/0103453 A1 * | 4/2009 | Hand | .................. | H04J 14/0284 370/254 |

(Continued)

FOREIGN PATENT DOCUMENTS

EP    2571184    3/2013
WO    02/11403    2/2002

*Primary Examiner* — Agustin Bello
(74) *Attorney, Agent, or Firm* — Patti & Malvone Law Group, LLC

(57) ABSTRACT

An exemplary technique is provided for planning a plurality of optical connections as a function of a plurality of traffic demand. In a routing step, a loopless network path is allocated to each traffic demand. Each traffic demand is allocated to a candidate optical connection or chain of candidate optical connections selected to carry the capacity of the traffic demand along the loopless network path allocated to the traffic demand. In an optimization step, a reduced set of candidate optical connections is defined by withdrawing the candidate optical connection to be withdrawn. A candidate optical connection or a chain of candidate optical connections is determined to be re-used among the reduced set of candidate optical connections. The traffic demand is re-allocated to the candidate optical connection or chain of candidate optical connections to be re-used.

13 Claims, 3 Drawing Sheets

(56) References Cited

U.S. PATENT DOCUMENTS

| | | | |
|---|---|---|---|
| 2010/0014859 A1* | 1/2010 | D'Alessandro | H04J 14/0284 398/48 |
| 2010/0254709 A1* | 10/2010 | Narvaez | H04J 3/062 398/98 |
| 2012/0321306 A1* | 12/2012 | Wellbrock | H04J 14/021 398/48 |
| 2013/0101286 A1* | 4/2013 | Takita | H04L 45/125 398/43 |
| 2013/0236169 A1* | 9/2013 | Gaudette | H04B 10/0793 398/25 |
| 2014/0099119 A1* | 4/2014 | Wei | H04J 14/0257 398/79 |
| 2014/0193154 A1* | 7/2014 | Graham | H04L 67/28 398/79 |
| 2015/0098699 A1* | 4/2015 | Bisson | H04Q 11/0062 398/48 |
| 2015/0288478 A1* | 10/2015 | Wellbrock | H04J 14/021 398/83 |

\* cited by examiner

PLANNING OF OPTICAL CONNECTIONS IN A WDM OPTICAL NETWORK

FIELD OF THE INVENTION

The invention relates to the technical field of optical communication systems, in particular to methods and devices for network design and planning.

BACKGROUND

When a WDM optical network has to be dimensioned in order to address a given traffic matrix, multilayer network design optimization consists in taking into account jointly the constraints of the diverse layers composing the WDM optical network, e.g. an optical transport layer and an electrical client layer. Multilayer network design optimization aims at reducing the cost of the network.

The network parameters that are available for optimization typically include:
- Path selection for each traffic demand, as there are many possible paths from the source to the destination. Besides, each traffic demand may have a different class of service.
- Intermediate grooming points, i.e. points of termination of the optical layer at intermediate nodes to reduce a total number of WDM interfaces by making efficient use of wavelength channels.
- Physical layer parameters (e.g. channel capacity) and constraints (e.g. wavelength continuity and physical transmission reach).

A network planning method that would seek an optimal solution, i.e. the one providing the lower network cost for all parameters in a real network would be very complex and time consuming.

SUMMARY

Network planning methods which are both simple and efficient are needed. In particular, network planning methods that are not too computation-intensive may be implemented in planning tools integrated in control systems that provide the path computing in deployed networks.

For that purpose, the invention provides a method for planning a plurality of optical connections in a WDM optical network as a function of a plurality of traffic demands in accordance with claim 1 and a device for planning a plurality of optical connections in a WDM optical network as a function of a plurality of traffic demands in accordance with claim 15.

More detailed embodiments are defined in the dependent claims.

Aspects of the invention stem from the observation that the prohibition of loops in a path computation process, while necessary to avoid a diverging number of solutions, may yield suboptimal connection maps in some cases.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
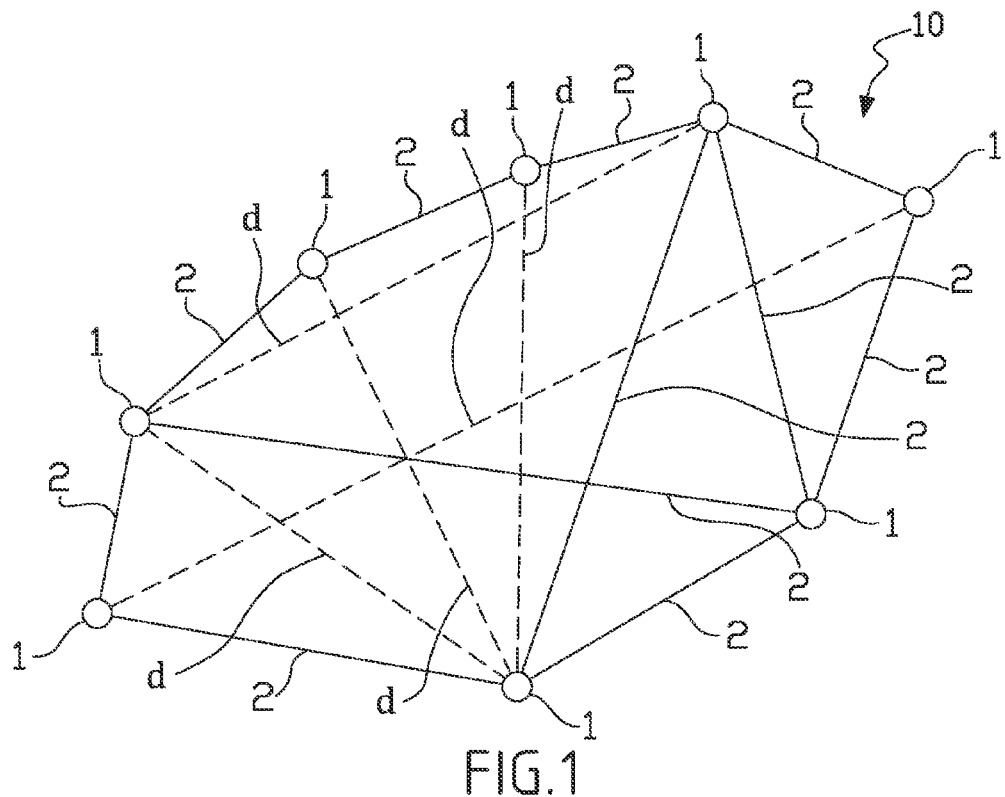
FIG. 1 is a schematic representation of an optical network in which embodiments of the invention can be implemented.

With reference to FIG. 1, a transparent WDM optical network 10 is schematically illustrated. Transparent optical switching nodes 1 are connected by optical links 2 to form a given topology. The term "transparent" is applied to a transmission system, in which the signal remains optical without being converted into an electronic signal when passing through a network switching node. Transparency in optical communication networks is a characteristic that makes it possible to reduce the cost and power consumption of network equipment by eliminating optical-electrical-optical conversions, and therefore the corresponding transducers. Transparent switching capability may exist in some or all of the switching nodes 1 of the optical network.

A variety of telecommunication equipment exists to implement such a network. Suitable optical switching nodes 1 include for example Alcatel Lucent's 1626 Light Manager and Alcatel Lucent's 1830 Photonic Service Switch.

FIG. 1 also represents a plurality of traffic demands d, each of which corresponds to a given amount of traffic to be carried between two end nodes. The demand d is represented as a straight dashed line linking both end nodes, although the actual path to be followed by the traffic is necessarily a sequence of the optical links 2, i.e. often enough not a straight line. In such a network, traffic is transported by optical connections, preferably transparent, which are generally bidirectional. For that purpose, an optical link 2 between two nodes 1 comprises preferably a pair of optical fibers, i.e. one for each direction. A network planning tool, preferably computer-implemented, is used in order to determine how to transport traffic demands d in an efficient manner, i.e. using a minimum amount of resources. It is especially of interest to minimize the number of WDM optical transponders used. A suitable method will now be described.

The method is adapted for planning a plurality of optical connections in a WDM optical network as a function of a plurality of traffic demands. A traffic demand is defined by a pair of end nodes and a capacity to be transported, e.g. in a bidirectional manner.

The method comprises an initial routing step that operates as follows.

To each traffic demand, a loopless network path that connects the pair of end nodes of the traffic demand is allocated.

A set of candidate optical connections suitable for fulfilling all the traffic demands is defined. Each candidate optical connection comprises a transmission capacity and a connection path that corresponds to one of:
 the loopless network path allocated to a traffic demand, and
 a subpath of the loopless network path allocated to a traffic demand.

Each traffic demand is then allocated to a candidate optical connection or a chain of candidate optical connections of the defined set. The candidate optical connection or chain of candidate optical connections is selected so as to carry the capacity of the traffic demand between the end nodes of the traffic demand along the loopless network path allocated to the traffic demand.

The method continues with an optimization step that operates as follows.

A candidate optical connection to be withdrawn is selected among the set of candidate optical connections and a reduced set of candidate optical connections is defined by withdrawing the candidate optical connection to be withdrawn.

Then, for each traffic demand allocated to the candidate optical connection to be withdrawn:

it is determined whether there exists a candidate optical connection or a chain of candidate optical connections to be re-used among the reduced set of candidate optical connections, that has a free-capacity adapted to carry the capacity of the traffic demand between the end nodes of the traffic demand, and when such connections exist, the traffic demand is re-allocated to the candidate optical connection or chain of candidate optical connections to be re-used.

Upon detecting that all the traffic demands allocated to the candidate optical connection to be withdrawn have been re-allocated, the reduced set of candidate optical connections is provided as a solution to the planning problem.

The initial traffic demands may be provided under the form of a configuration file in a computer memory or other data repository. The resulting set of candidate optical connections with their traffic demand allocations may be provided in the same manner.

The WDM optical network may be considered as a multi-layer system. Indeed, the WDM optical signals form a transport layer the main features of which are transparency, wavelength continuity, traffic aggregation and high data rates. The modulated data carried by the WDM optical signals forms a client layer that can only be attained by terminating the optical transport layer.

As used herein, the term "candidate optical connections" refers to continuous connections in the transport layer of the WDM optical network, i.e. signals that do not attain the client layer between the source and the destination of the optical connection. Such optical connections may be signaled as Lambda-LSP's in a GMPLS framework, where LSP stands for Label-switched path and GMPLS for Generalized Multi-protocol label-switching. It should be noted that signal regeneration may be necessary in certain long optical connections, e.g. due to physical impairments and/or wavelength continuity constraints.

The routing step may be implemented in diverse manners. A main aspect of the routing step is the prohibition of loops, i.e. a path that goes twice through the same node. The routing step is restricted to loopless paths so that the initial path computation can be completed at a reasonable computational cost without divergence. The routing step may involve the computation of one path per traffic demand or a plurality of path per traffic demand.

In a simple embodiment, the routing step comprises, for at least one or for each traffic demand, the computing of a single loopless network path that connects the pair of end nodes of the traffic demand, e.g. the shortest path.

In another embodiment, the routing step comprises, for at least one or for each traffic demand:
computing a plurality of candidate loopless network paths that connect the pair of end nodes of the traffic demand, and selecting the loopless network path allocated to the traffic demand within the plurality of candidate loopless network paths as a function of a transponder-cost of the set of candidate optical connections resulting from the selection.

In an embodiment the path computation determines k shortest paths for each traffic demand, where k is an integer number greater than 1. This embodiment is advantageous in that it provides a higher number of paths combinations to promote traffic aggregation at the routing step, if such traffic aggregation is desired.

The step of defining a set of candidate optical connections may be implemented diverse manners as well. Main aspects of the set of candidate optical connections are:

The set of candidate optical connections must fulfill all the traffic demands.

The set of candidate optical connections should be as cost-efficient as possible, e.g. by performing some aggregation of the traffic demands to limit a number of transponders used.

In a simple embodiment, the set of candidate optical connections comprises a respective candidate optical connection or chain of candidate optical connections for each one of the traffic demands. This embodiment does not provide any aggregation of the traffic demands.

In another embodiment, the routing step further comprises: determining that the loopless network paths allocated to a plurality of traffic demands have a shared path or subpath, i.e. a shared sequence of at least two nodes,
defining a candidate optical connection as an aggregating candidate optical connection, wherein the aggregating candidate optical connection follows the shared path or subpath and has a transmission capacity suitable for cumulating the capacities of the plurality of traffic demands, and
allocating the plurality of traffic demands to the aggregating candidate optical connection.

It should be noted that the higher the number k of paths that are computed for each traffic-demand, the higher the number of shared paths or subpaths that may be found in the routing step to aggregate the traffic demands. However, an high number k will generate a huge number of path combinations to be tested and thus increase the computation time.

After the routing step, the method continues to an optimization step that seeks to reduce the set of optical connections, while eliminating the prohibition of loops.

The selection of the candidate optical connection to be withdrawn may be implemented using a variety of criteria.

In an embodiment, the candidate optical connection to be withdrawn is selected among the set of candidate optical connections as a function of a low used-capacity criterion. Namely, this embodiment is based on the consideration that connections that have a low used-capacity should be tested first, because it should be easier to re-route their relatively limited amount of traffic onto the remaining candidate connections. As an example, the low transmission capacity criterion may be defined to select the candidate optical connection having a lowest used-capacity in absolute terms, e.g. in Gb/s of used capacity, or in relative terms, in percentage of used capacity vs. total capacity of the connection.

In another embodiment, the candidate optical connection to be withdrawn is selected among the set of candidate optical connections as a function of a high free-capacity criterion. Namely, this embodiment is based on the consideration that connections that have a high free-capacity should be tested first, because it should optimize the cost reduction by avoiding cases in which a high rate optical connection serves to carry low bandwidth traffic. This makes especially sense when a mix of optical connection rates are deployed in the network, e.g. 10 Gb/s, 40 Gb/s and 100 Gb/s. As an example, the high free-capacity criterion may be defined to select the candidate optical connection having a highest free-capacity in absolute terms, e.g. in Gb/s of free capacity, or in relative terms, in percentage of free capacity vs. total capacity of the connection.

Many alternative selection criteria may be employed, e.g. based on a variety of parameters such as the connection length in number of hops or in absolute distance, the physical quality of the transmission, and the like. In particular, the withdrawing of an optical connection having high physical impairments may be useful to reduce the number of regenerators employed by the corresponding traffic demands.

Preferably, the optimization step is carried out so as to keep at least a predefined amount of free-capacity in the remaining optical connections, e.g. about 5% of the total capacity. This measure is useful to keep the network ready for accommodating a future traffic growth, e.g. a predictable one. In a corresponding embodiment, the optimization step further comprises:
determining a free-capacity of each optical connection of the reduced set, prohibiting the reallocation of the traffic demand to an optical connection when the reallocation will cause reduction of the free-capacity of the optical connection below a predefined free-capacity threshold.

Preferably, the optimization step is carried out so as to avoid the withdrawing of an optical connection that is filled up beyond a predefined threshold, e.g. above 95% of the total capacity. This measure improves the efficiency of the method since it is unlikely that the use of resources, e.g. optical transponders may be substantially improved by deleting a connection that is very efficiently used, i.e. close to full capacity.

In an embodiment, the method further comprises iterating the optimization step with the reduced set of candidate optical connections obtained at the previous optimization step until a convergence criterion is fulfilled.

The convergence criterion may be defined in several ways.

In an embodiment, the convergence criterion is the detection that no candidate optical connection to be re-used is available in the reduced set for a traffic demand allocated to the candidate optical connection to be withdrawn.

In an embodiment, the convergence criteria is only fulfilled when all candidate optical connections have been tested for the candidate optical connection to be withdrawn, so that the set of optical connections cannot be further reduced by repeating the optimization step of the method.

For the sake of illustration, the above principles will now be applied to three examples illustrated in the FIGS. 2 to 6. In these Figures, the letters A, B, C and D denote optical switching nodes having a transparent switching capability and the number 2 denotes a physical link between two nodes, e.g. optical fibers. The traffic demands in each example are defined in the tables 1 to 3 appended below. For the sake of simplicity, the traffic demands and the resulting optical connections contemplated are bidirectional. However, single-direction demands and connections may be managed in the same manner. For the sake of simplicity also, all optical connections contemplated are a total capacity of 10 Gb/s. However, the same methods are applicable to connections at any data rates, e.g. 2.5, 40, 100, 200 Gb/s and others. The connection capacities within the network are not necessarily uniform, e.g. due to some hardware heterogeneity of the optical nodes.

Example 1

Figure 2:
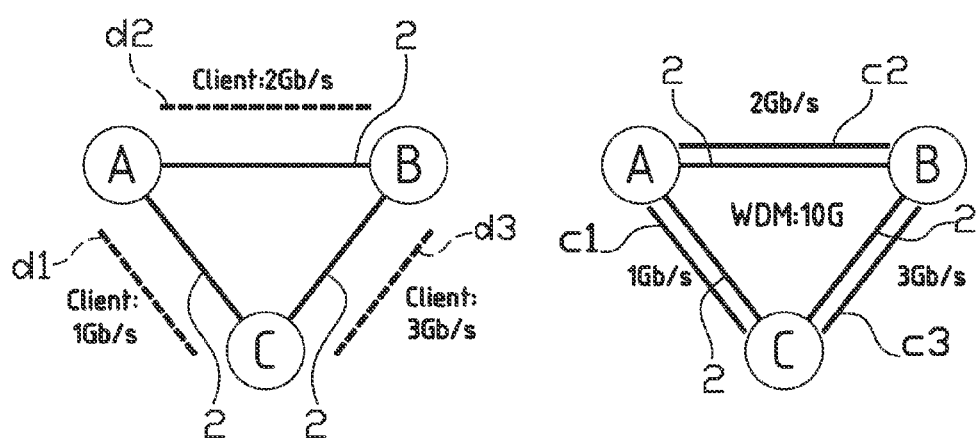
FIG. 2 is a functional representation of an optical network in which a routing step is executed, in accordance with a first example.
Figure 3:
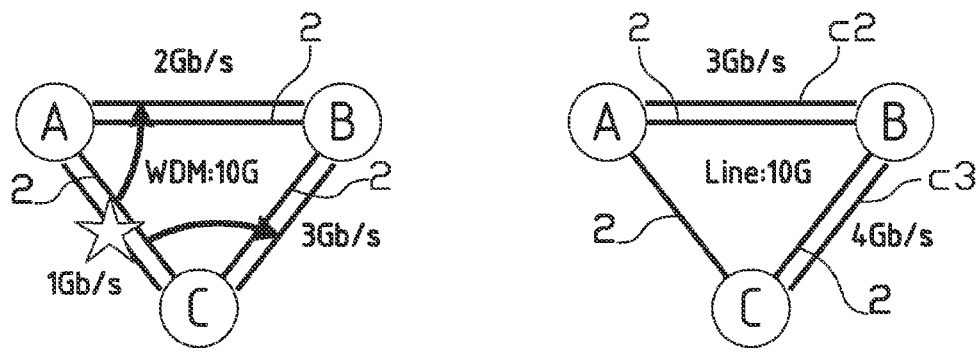
FIG. 3 is a functional representation of the optical network of FIG. 2 in which an optimization step is executed, in accordance with the first example.

FIGS. 2 and 3

TABLE 1

Traffic matrix for FIG. 2

| Demand | Capacity | Source | Destination | Allocated Path |
|--------|----------|--------|-------------|----------------|
| d1 | 1 | A | C | A-C |
| d2 | 3 | B | C | B-C |
| d3 | 2 | A | B | A-B |

FIG. 2 illustrates the routing step. In FIG. 2, the traffic demands are denoted by a dashed-line (left side). The paths are allocated as a result of a simple shortest path computation. The routing step does not perform any aggregation of the traffic demands. Namely, three candidate optical connections c1, c2 and c3 each carrying a single demand are defined as a result of the routing step (right side).

FIG. 3 illustrates the optimization step. Candidate optical connections c1 is selected as the connection to be withdrawn as shown by the star, e.g. by using the lowest used-capacity criterion (left side). As a result, a re-routing solution is sought for traffic demand d1 among the reduced set made of c2 and c3. Then it is found that the chain of optical connections c2-c3 provides a suitable solution. Then the traffic demand d1 is re-allocated to the connection c2 on the subpath A-B and to the connection c3 on the subpath B-C, as shown by the arrows (left side).

As a result, connection c1 is not considered anymore. The planned connection map (right side) fulfills all the traffic demands with only two optical connections c2 and c3. One connection was saved through the optimization step.

Example 2

FIG. 4

TABLE 2

Figure 4:
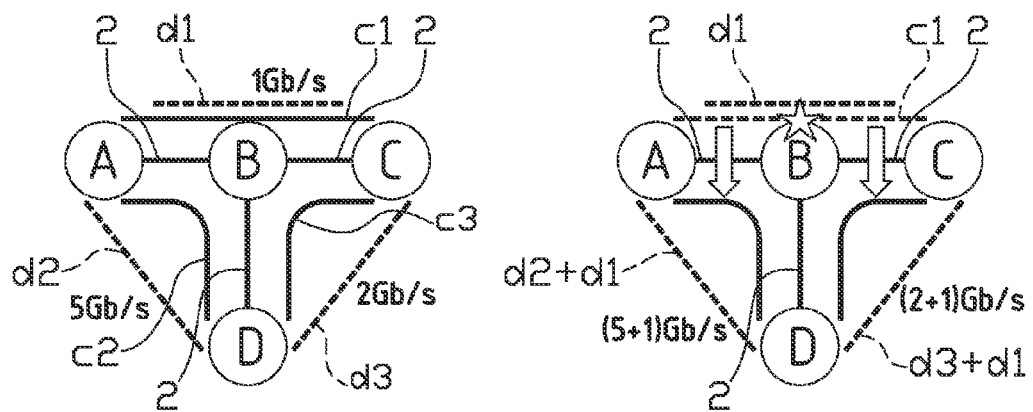
FIG. 4 is a functional representation of an optical network in which a routing step and an optimization step are executed, in accordance with a second example.

Traffic matrix for FIG. 4

| Demand | Capacity | Source | Destination | Allocated Path |
|--------|----------|--------|-------------|----------------|
| d1 | 1 | A | C | A-B-C |
| d2 | 5 | A | D | A-B-D |
| d3 | 2 | D | C | D-B-C |

The same notations are used as in example 1. The left side of FIG. 4 illustrates the routing step. The paths are allocated as a result of a simple shortest path computation. The routing step does not perform any aggregation of the traffic demands. Namely, three candidate optical connections c1, c2 and c3 each carrying a single demand are defined as a result of the routing step.

The right side of FIG. 4 illustrates the optimization step. Candidate optical connections c1 is selected as the connection to be withdrawn as shown by the star, e.g. by using the lowest used-capacity criterion (right side). As a result, a re-routing solution is sought for traffic demand d1 among the reduced set made of c2 and c3. Then it is found that the chain of optical connections c2-c3 provides a suitable solution. Then the traffic demand d1 is re-allocated to the connection c2 on the subpath A-B-D and to the connection c3 on the subpath D-B-C, as shown by the arrows (right side).

As a result, connection c1 is not considered anymore. The planned connection map (right side) fulfills all the traffic demands with only two optical connections c2 and c3. One connection was saved through the optimization step.

Moreover, the demand d1 is now routed through a looped path that could never have been found by the routing step.

Example 3

Figure 5:
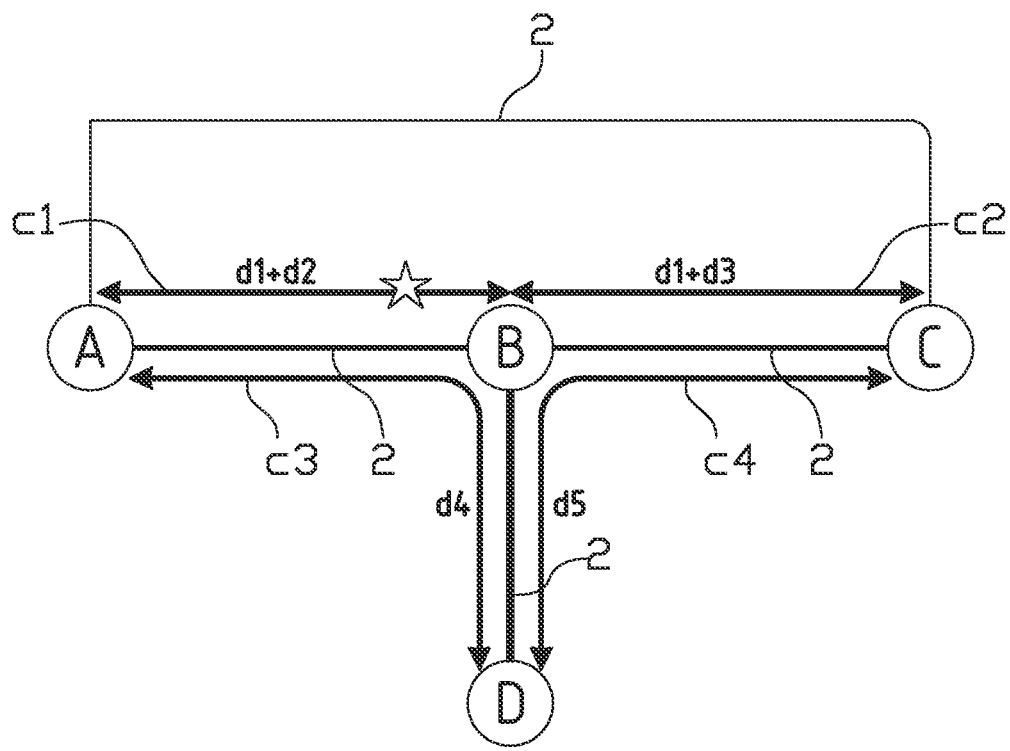
FIG. 5 is a functional representation of an optical network in which a routing step is executed, in accordance with a third example.
Figure 6:
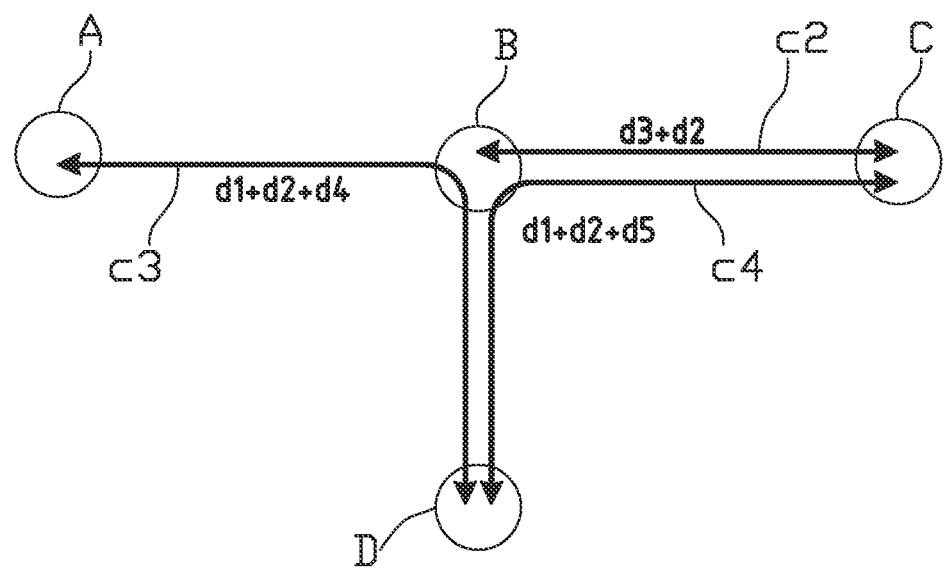
FIG. 6 is a functional representation of the optical network of FIG. 5 in which an optimization step is executed, in accordance with the third example.

FIGS. 5 and 6

TABLE 3

Traffic matrix for FIG. 5

| Demand | Capacity | Source | Destination | Allocated Path |
|---|---|---|---|---|
| d1 | 1 | A | C | A-B-C |
| d2 | 1 | A | B | A-B |
| d3 | 1 | B | C | B-C |
| d4 | 5 | A | D | A-B-D |
| d5 | 5 | D | C | D-B-C |

Example 3 illustrates how traffic demand aggregation may already be implemented at the routing step. The same notations are used as in example 1.

FIG. 5 illustrates the routing step. The paths are allocated as a result of a k-shortest path computation, e.g. k=2. The routing step does perform aggregation of the traffic demands d1 and d2 on the subpath A-B and d1 and d3 on the subpath B-C. Namely, four candidate optical connections c1, c2, c3 and c4 are obtained for carrying the five traffic demands as a result of the routing step.

FIG. 6 illustrates the optimization step. Candidate optical connections c1 is selected as the connection to be withdrawn as shown by the star, e.g. by using the lowest used-capacity criterion (FIG. 5). As a result, a re-routing solution is sought among the reduced set made of c2, c3, c4 and c5 for both traffic demands d1 and d2 on the path A-B.

Then it is found that the chain of optical connections c3-c4 provides a suitable solution for demand d1 and that the chain of optical connections c3-c4-c2 provides a suitable solution for demand d2. The traffic demand d1 is re-allocated to the connection c3 on the path A-B-D and to the connection c4 on the path D-B-C. The traffic demand d2 is re-allocated to the connection c3 on the path A-B-D, to the connection c4 on the path D-B-C and to the connection c2 on the path C-B.

As a result, connection c1 is not considered anymore. The planned connection map now fulfills all the traffic demands with only three optical connections c2, c3 and c4. One additional connection was saved through the optimization step.

Again, the demands d1 and d2 are now routed through looped paths that could never have been found by the routing step, even by applying a k-shortest paths search (k>1).

When the withdrawing of an optical connection causes the rerouting of several traffic demands, as illustrated in example 3 with demands d1 and d2, the order in which the demands are reallocated may bear some importance. This order may be selected as a function of diverse parameters. In preferred embodiments, the reallocation is executed as a function of the capacity of the traffic demands, from the largest capacity to the smallest capacity. The class of service of the demands may be taken into consideration similarly, from the most constrained to the less constrained. "Best effort" services may also be discarded in some cases, e.g. when such discarding saves an optical connection.

The above methods may be implemented by a computer program comprising instruction codes executable by a computer to execute the method, or by a computer-implemented planning tool comprising a processor configured for executing the method. In embodiments, the planning tool could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for planning a plurality of optical connections in an optical network as a function of a plurality of traffic demands, wherein each traffic demand comprises a pair of end nodes and a capacity, the method comprising:
   in a routing step:
      to each traffic demand, allocating a loopless network path that connects the pair of end nodes of the traffic demand;
      defining a set of candidate optical connections suitable for fulfilling all the traffic demands, wherein the candidate optical connections are continuous connections in a transport layer of the optical network, and wherein each candidate optical connection comprises a transmission capacity and a connection path that corresponds to one of:
         the loopless network path allocated to a traffic demand,
         a subpath of the loopless network path allocated to a traffic demand,
      allocating each traffic demand to a candidate optical connection or a chain of candidate optical connections selected to carry the capacity of the traffic demand between the end nodes of the traffic demand along the loopless network path allocated to the traffic demand;
   and in an optimization step:
      selecting a candidate optical connection to be withdrawn among the set of candidate optical connections;
      defining a reduced set of candidate optical connections by withdrawing the candidate optical connection to be withdrawn;
      for each traffic demand allocated to the candidate optical connection to be withdrawn,
         determining a candidate optical connection or a chain of candidate optical connections to be re-used among the reduced set of candidate optical connections, so that the candidate optical connection or chain of candidate optical connections to be re-used has a free-capacity adapted to carry the capacity of the traffic demand between the end nodes of the traffic demand;
         re-allocating the traffic demand to the candidate optical connection or chain of candidate optical connections to be re-used;

detecting that all the traffic demands allocated to the candidate optical connection to be withdrawn have been re-allocated; and providing the reduced set of candidate optical connections.

2. The method in accordance claim 1, wherein the routing step further comprises, for each traffic demand:

computing a single loopless network path that connects the pair of end nodes of the traffic demand.

3. The method in accordance with claim 1, wherein the routing step further comprises, for each traffic demand:

computing a plurality of candidate loopless network paths that connect the pair of end nodes of the traffic demand; and selecting the loopless network path allocated to the traffic demand within the plurality of candidate loopless network paths as a function of a transponder-cost of the set of candidate optical connections resulting from the selection.

4. The method in accordance with claim 1, wherein the step of defining the set of candidate optical connections suitable for fulfilling all the traffic demands comprises defining a respective candidate optical connection or chain of candidate optical connections for each one of the traffic demands.

5. The method in accordance with claim 1, wherein the routing step further comprises:

determining that the loopless network paths allocated to a plurality of traffic demands have a shared path or subpath;

defining a candidate optical connection as an aggregating candidate optical connection, wherein the aggregating candidate optical connection follows the shared path or subpath and has a transmission capacity suitable for cumulating the capacities of the plurality of traffic demands; and allocating the plurality of traffic demands to the aggregating candidate optical connection.

6. The method in accordance with claim 1, further comprising iterating the optimization step with the reduced set of candidate optical connections obtained at the previous optimization step until a convergence criterion is fulfilled.

7. The method in accordance with claim 6, wherein the convergence criterion is the detection that no candidate optical connection to be re-used is available in the reduced set for a traffic demand allocated to the candidate optical connection to be withdrawn.

8. The method in accordance with claim 1, wherein the candidate optical connection to be withdrawn is selected among the set of candidate optical connections as a function of a low used-capacity criterion.

9. The method in accordance with claim 8, wherein the low transmission capacity criterion is fulfilled by the candidate optical connection that has a lowest used-capacity in absolute or relative terms.

10. The method in accordance with claim 1, wherein the candidate optical connection to be withdrawn is selected among the set of candidate optical connections as a function of a high free-capacity criterion.

11. The method in accordance with claim 10, wherein the high free-capacity criterion is fulfilled by the candidate optical connection that has a highest free-capacity in absolute or relative terms.

12. The method in accordance with claim 1, wherein the optimization step further comprises:

determining a free-capacity of each optical connection of the reduced set; and prohibiting the reallocation of the traffic demand to an optical connection when the reallocation will cause reduction of the free-capacity of the optical connection below a predefined free-capacity threshold.

13. A device for planning a plurality of optical connections in an optical network as a function of a plurality of traffic demands, wherein each traffic demand comprises a pair of end nodes and a capacity, the device comprising:

a data repository for storing the plurality of traffic demands; and a processor configured to:

to each traffic demand, allocate a loopless network path that connects the pair of end nodes of the traffic demand;

define a set of candidate optical connections suitable for fulfilling all the traffic demands, wherein each candidate optical connection comprises a transmission capacity and a connection path that corresponds to one of:

the loopless network path allocated to a traffic demand, a subpath of the loopless network path allocated to a traffic demand, allocate each traffic demand to a candidate optical connection or a chain of candidate optical connections selected to carry the capacity of the traffic demand between the end nodes of the traffic demand along the loopless network path allocated to the traffic demand;

select a candidate optical connection to be withdrawn among the set of candidate optical connections;

define a reduced set of candidate optical connections by withdrawing the candidate optical connection to be withdrawn;

for each traffic demand allocated to the candidate optical connection to be withdrawn, determine a candidate optical connection or a chain of candidate optical connections to be re-used among the reduced set of candidate optical connections, so that the candidate optical connection or chain of candidate optical connections to be re-used has a free-capacity adapted to carry the capacity of the traffic demand between the end nodes of the traffic demand;

re-allocate the traffic demand to the candidate optical connection or chain of candidate optical connections to be re-used;

detect all the traffic demands allocated to the candidate optical connection to be withdrawn have been re-allocated; and provide the reduced set of candidate optical connections.

* * * * *